United States Patent
Xie et al.

(10) Patent No.: US 10,823,898 B1
(45) Date of Patent: Nov. 3, 2020

(54) LIGHT GUIDE PLATE AND FABRICATION METHOD THEREOF, BACKLIGHT, DISPLAY DEVICE AND DOT STRIKING APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Junjie Xie, Beijing (CN); Yezhou Tan, Beijing (CN); Bin Xiang, Beijing (CN); Zhenxing Luo, Beijing (CN); Yinwei Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/841,755

(22) Filed: Apr. 7, 2020

(30) Foreign Application Priority Data

Nov. 22, 2019 (CN) .......................... 2019 1 1156653

(51) Int. Cl.
  *F21V 8/00* (2006.01)
(52) U.S. Cl.
  CPC ......... *G02B 6/0043* (2013.01); *G02B 6/0053* (2013.01); *G02B 6/0055* (2013.01); *G02B 6/0065* (2013.01)
(58) Field of Classification Search
  CPC .. G02B 6/0043; G02B 6/0053; G02B 6/0055; G02B 6/0065

USPC ......................................................... 362/607
See application file for complete search history.

(56) References Cited

U.S. PATENT DOCUMENTS

| 7,847,879 B2 * | 12/2010 | Choi ................. G02F 1/133308 349/58 |
| 10,042,103 B2 * | 8/2018 | Yeo ....................... G02B 6/0068 |
| 10,663,640 B2 * | 5/2020 | Song ..................... G02F 1/1368 |
| 2008/0219026 A1 | 9/2008 | Zhu |

(Continued)

FOREIGN PATENT DOCUMENTS

| CN | 101261338 A | 9/2008 |
| CN | 107870468 A | 4/2018 |

(Continued)

OTHER PUBLICATIONS

Chinese Office Action in Chinese Application No. 201911156653.8, dated Jul. 1, 2020 with English translation.

*Primary Examiner* — Bryon T Gyllstrom
(74) *Attorney, Agent, or Firm* — Collard & Roe, P.C.

(57) ABSTRACT

A light guide plate, a backlight, a display device, and a dot striking apparatus and a method for fabricating the light guide plate are provided. In the light guide plate, the bottom surface of the light guide plate includes a first region and a second region, first dot structures are arranged in the first region and a transition region of the second region that is adjacent to an edge of the first region, an outer surface of each of the first dot structures has a surface roughness greater than a threshold, so that a portion of the incident light is diffusely reflected by the first dot structures and emits, and second dot structures are arranged in a region other than the transition region of the second region.

20 Claims, 5 Drawing Sheets

(56) References Cited

U.S. PATENT DOCUMENTS

| | | | |
|---|---|---|---|
| 2009/0257245 A1* | 10/2009 | Kim | G02B 6/0061 |
| | | | 362/626 |
| 2010/0027293 A1* | 2/2010 | Li | G02B 6/0036 |
| | | | 362/619 |
| 2010/0271568 A1* | 10/2010 | Jung | G02B 6/0083 |
| | | | 349/65 |
| 2017/0146730 A1* | 5/2017 | O'Keeffe | G02B 6/0095 |
| 2017/0343721 A1* | 11/2017 | Takada | G02B 6/0021 |
| 2018/0196275 A1* | 7/2018 | Robinson | G02B 6/0056 |
| 2018/0210279 A1* | 7/2018 | Baek | G02F 1/133602 |
| 2019/0086604 A1* | 3/2019 | Yasunaga | G02F 1/133615 |

FOREIGN PATENT DOCUMENTS

| | | |
|---|---|---|
| CN | 207198373 U | 4/2018 |
| CN | 207992496 U | 10/2018 |
| JP | 2008-084544 A | 4/2008 |

* cited by examiner

LIGHT GUIDE PLATE AND FABRICATION METHOD THEREOF, BACKLIGHT, DISPLAY DEVICE AND DOT STRIKING APPARATUS

The present application claims priority of Chinese Patent Application No. 201911156653.8 filed on Nov. 22, 2019, for all purpose, the disclosure of which is incorporated herein by reference in its entirety as part of embodiments of the present disclosure.

TECHNICAL FIELD

Embodiments of the present disclosure relate to a light guide plate, a backlight, a display device, and a dot striking apparatus and a method for fabricating the light guide plate.

BACKGROUND

Some display panels (e.g., liquid crystal display panels) do not emit light by themselves, so it is necessary to provide a backlight on a back side of the display panels to supply the display panels with light required for display. In order to achieve a good display effect, it is hoped that the backlight can supply the display panels with light of high brightness and good brightness uniformity.

SUMMARY

According to embodiments of the disclosure, a light guide plate is provided. The light guide plate comprises a light guide plate body, the light guide plate body including a light emission surface, a bottom surface opposite to the light emission surface, and a plurality of side surfaces connecting the light emission surface and the bottom surface. Corners of the light guide plate body are curved structures, each of the curved structures includes a first region located in the bottom surface, a curved surface region located in the side surfaces, and a third region located in the light emission surface and opposite to the first region; one side surface of the plurality of side surfaces is configured as a light incident surface of the light guide plate body, and a region other than the curved surface region of the light incident surface is configured for receiving incident light from a light source; the light guide plate bottom surface further includes a second region other than the first region; a plurality of first dot structures are arranged in the first region and a transition region of the second region that is adjacent to an edge of the first region; an outer surface of each of the first dot structures has a surface roughness greater than a threshold, so that a portion of the incident light is diffusely reflected to the third region by the first dot structures and emits; and a plurality of second dot structures are arranged in a region other than the transition region of the second region.

For example, each of the first dot structures is a three-dimensional curved structure protruding from the bottom surface along a direction away from the light emission surface; or each of the first dot structures is a pyramidal frustum structure protruding from the bottom surface along the direction away from the light emission surface; or among the plurality of first dot structures, at least one first dot structure is the three-dimensional curved structure protruding from the bottom surface along the direction away from the light emission surface and at least one first dot structure is the pyramidal frustum structure protruding from the bottom surface along the direction away from the light emission surface.

For example, the pyramidal frustum structure has a first end surface and a second end surface that are opposite to each other; the first end surface is located in the bottom surface; the second end surface is away from the bottom surface; and an area of the first end surface is larger than an area of an orthographic projection of the second end surface on the bottom surface.

For example, the second end surface of the pyramidal frustum structure is an arc surface.

For example, the three-dimensional curved structure is a hemispherical structure.

For example, each of the second dot structures is a three-dimensional structure protruding from the bottom surface along a direction away from the light emission surface and includes a first inclined surface having an angle with respect to the bottom surface; and the first inclined surface totally reflects light incident thereon into the light guide plate body.

For example, a maximum length of an orthographic projection of each of the first dot structures on the bottom surface is smaller than a maximum length of an orthographic projection of each of the second dot structures on the bottom surface.

For example, an arrangement density of the plurality of first dot structures is smaller than an arrangement density of the plurality of second dot structures.

For example, a maximum length of an orthographic projection of each of the first dot structures on the bottom surface is 10 μm to 30 μm.

For example, the surface roughness of the outer surface of each of the first dot structures is represented by Ra, which is 0.01 μm to 0.05 μm.

For example, an outer surface of each of the second dot structures is smooth.

For example, an area of the transition region of the second region is in direct proportion to a target display brightness of the first region adjacent to the transition region.

For example, a plurality of third dot structures are arranged in a portion of the second region between two first regions at one end, close to the light incident surface, of the light guide plate body, and are arranged in a portion of the second region between two first regions at one end, away from the light incident surface, of the light guide plate body, and the third dot structures are arranged at spaces between the plurality of second dot structures; an arrangement density of the third dot structures in the second region is smaller than an arrangement density of the first dot structures in the first region and the transition region; and an outer surface of each of the third dot structures has a same surface roughness as the outer surface of each of the first dot structures.

For example, a structure of each of the third dot structures is the same as a structure of each of the first dot structures.

According to the embodiments of the disclosure, a backlight is provided. The backlight comprises: a light source, a reflective plate, an inverted-prism, and the light guide plate as described above. The light source is arranged opposite to the region other than the curved surface region of the light incident surface; the reflective plate is provided on a side of the bottom surface that is away from the light emission surface; the inverted-prism is provided on a side of the light emission surface that is away from the bottom surface; the inverted-prism includes a substrate and a prism arranged on the substrate; and the prism is located on a side of the substrate that is close to the light emission surface.

According to the embodiments of the disclosure, a display device is provided. The display device comprises: the backlight as described above and a display panel. Light emitted from the backlight enters the display panel.

According to the embodiments of the disclosure, a dot striking apparatus for fabricating the light guide plate as described above is provided. The dot striking apparatus comprises: a first striker and a second striker. The first striker includes a first tool holder and a first tool head located at an end of the first tool holder, and the second striker includes a second tool holder and a second tool head located at an end of the second tool holder; the first tool head is configured for striking a mold core for forming dot structures of the light guide plate, so as to form first dot molds corresponding to the first dot structures in the mold core for forming dot structures of the light guide plate; and the second tool head is configured for striking the mold core for forming dot structures of the light guide plate, so as to form second dot molds corresponding to the second dot structures in the mold core for forming dot structures of the light guide plate.

For example, a top surface of the first tool head has a same surface roughness as the outer surface of each of the first dot structures.

According to the embodiments of the disclosure, a method for fabricating the light guide plate by using the dot striking apparatus as described above is provided. The method comprises: striking the mold core for forming dot structures of the light guide plate by using the second striker of the dot striking apparatus according a second arrangement rule, to form the second dot molds corresponding to the second dot structures in the mold core for forming dot structures of the light guide plate; striking the mold core for forming dot structures of the light guide plate by using the first striker of the dot striking apparatus according a first arrangement rule, to form the first dot molds corresponding to the first dot structures in the mold core for forming dot structures of the light guide plate; and performing an injection molding process by using the mold core for forming dot structures of the light guide plate which includes the first dot molds and the second dot molds to obtain the light guide plate. Dot structure coordinates corresponding to the second arrangement rule are pre-generated by simulation according to a target display brightness of the second region; dot structure coordinates corresponding to the first arrangement rule are pre-generated by simulation according to a target display brightness of the first region; before forming the second dot molds, the dot structure coordinates corresponding to the second arrangement rule are input into the dot striking apparatus; and before forming the first dot molds, the dot structure coordinates corresponding to the first arrangement rule are input into the dot striking apparatus.

For example, a plurality of third dot structures are arranged in a portion of the second region between two first regions at one end, close to the light incident surface, of the light guide plate body, and are arranged in a portion of the second region between two first regions at one end, away from the light incident surface, of the light guide plate body, and the third dot structures are arranged at spaces between the plurality of second dot structures; an arrangement density of the third dot structures in the second region is smaller than an arrangement density of the first dot structures in the first region and the transition region; before performing the injection molding process, the method further comprises: striking the mold core for forming dot structures of the light guide plate by using the first striker of the dot striking apparatus according a third arrangement rule, to form third dot molds corresponding to the third dot structures in the mold core for forming dot structures of the light guide plate; dot structure coordinates corresponding to the third arrangement rule are pre-generated by simulation according to the target display brightness of the first region; and before forming the third dot molds, the dot structure coordinates corresponding to the third arrangement rule are input into the dot striking apparatus.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings. It is obvious that the described embodiments are just a part but not all of the embodiments of the present disclosure. Based on the described embodiments herein, those skilled in the art can obtain other embodiment(s), without any inventive work, which should be within the scope of the present disclosure.

The embodiments of the present disclosure will be described in detail below, and the embodiments of the present disclosure are shown in the drawings, in which the same or similar reference signs indicate the same or similar components or components having the same or similar functions throughout. Further, if detailed description of the known art is unnecessary for the features of the illustrated embodiments of the present disclosure, then it is omitted.

The embodiments described below with reference to the drawings are exemplary, which are only used to explain the embodiments of the present disclosure, and cannot be construed as limitative of the embodiments of the present disclosure.

It may be understood by those skilled in the art that, unless otherwise defined, all terms (including technical terms and scientific terms) used here have the same meaning as generally understood by those ordinarily skilled in the art to which the embodiments of the present disclosure belong. It should also be understood that, terms such as those defined in the general dictionary should be understood to have meanings consistent with the meanings in the context of the prior art, and will not be explained with idealized or overly formal meanings unless specifically defined as here.

An ultra-high-brightness inverted-prism backlight refers to a backlight which has approximate brightness of 16,000 to 24,000 $cd/m^2$ (Candela per square meter), that is 1.6 to 1.8 times higher than a brightness of a conventional backlight, and mainly comprises a reflective sheet, a light bar, a light guide plate, an inverted prism and other components. The light bar usually includes a plurality of Light Emitting Diodes (LEDs). A plurality of heteromorphic dot structures with specific angles are arranged on a bottom surface of the light guide plate; and under actions of the heteromorphic dot structures provided on the bottom surface of the light guide plate and the inverted prism provided on a side of the light guide plate that is opposite to the bottom surface, all light incident on an inclined surface of the inverted prism is collected as light emergent approximately in a normal direction of the backlight, thereby greatly improving brightness of the backlight.

Backlights applied to mobile phones and other items basically comprise curved structures such as rounded corners; the LEDs of the light bar cannot be arranged at the rounded corners, and light cannot be scattered to the rounded corners because of vertical light extraction effect of the heteromorphic dot structures and the inverted prism, so that there is no light at the rounded corners, thereby causing an obvious dark corner defect at the rounded corners of the backlight. For example, a view angle for inspecting the backlight is $0° \leq \alpha \leq 160°$ (cases being the same in both an X direction and a Y direction); and in a case that an effect of the backlight is inspected by using a conventional backlight inspection method, a serious dark corner defect will exit at the rounded corners or curved positions of the backlight, rendering that the inverted-prism ultra-high-brightness backlight is inapplicable to the heteromorphic backlights with rounded corners.

For example, a light scattering effect may be enhanced by adding dot structures formed by laser or dot structures formed by dot striking at the rounded corners. However, the problem of the dark corner defect at the rounded corners still cannot be solved, for reasons such as inability to fabricate small-sized dot structures due to apparatus limitation with respect to the dot structures formed by laser and a poor scattering effect with respect to the dot structures formed by dot striking.

Figure 1:
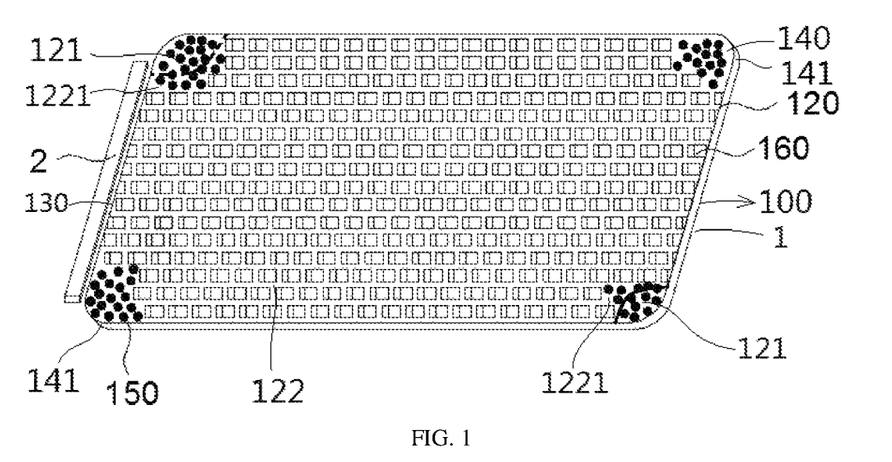
FIG. 1 is a structural schematic diagram of a bottom surface of a light guide plate provided by embodiments of the present disclosure.

FIG. 1 is a structural schematic diagram of a bottom surface of a light guide plate provided by the embodiments of the present disclosure. As shown in FIG. 1, the embodiments of the present disclosure provide a light guide plate 1, comprising: a light guide plate body 100.

The light guide plate body 100 includes a light emission surface 110 (referring to FIG. 3 below), a light guide plate bottom surface 120 opposite to the light emission surface 110, and a plurality of side surfaces connecting the light emission surface 110 and the light guide plate bottom surface 120; corners of the light guide plate body 100 are curved structures 140; each of the curved structure 140 includes a first region 121 located in the light guide plate bottom surface 120, a curved surface region 141 located in the side surfaces of the light guide plate body 100, and a third region 111 located in the light emission surface 110 and opposite to the first region 121; one side surface of the plurality of side surfaces is used as a light incident surface 130 of the light guide plate body 100, and a region other than the curved surface region 141 in the light incident surface 130 is used for receiving incident light from a light source 2.

The light guide plate bottom surface 120 includes two portions: one portion is the first region 121 located at the curved structure 140, and the other portion is a second region 122 other than the first region 121.

A plurality of first dot structures 150 are arranged in the first region 121 and a transition region 1221 of the second region 122 that is adjacent to an edge of the first region 121; and an outer surface of each of the first dot structures 150 has a surface roughness greater than a threshold, so that a portion of the incident light is diffusely reflected to the third region 111 (a region of the light emission surface 110 that corresponds to the first region 121) by the first dot structures and emits.

A plurality of second dot structures 160 are arranged in other region of the second region 122.

For example, the light source 2 is a light bar, and the light bar includes a plurality of Light-Emitting Diodes (LEDs).

For example, as shown in FIG. 1, the light guide plate body 100 is a quadrangle, and the light guide plate body 100 includes four corners. However, the embodiments of the present disclosure do not limit the shape of the light guide plate body 100 and the total number of corners, which may be flexibly selected according to the actual requirements. For example, the light guide plate body 100 is a triangle, and the light guide plate body 100 includes three corners. For example, the light guide plate body 100 is a pentagon, and the light guide plate body 100 includes five corners.

For example, the surface roughness is represented by Ra (i.e. arithmetic average of the absolute values of the roughness profile ordinates), and the above threshold for the surface roughness Ra is 0.01 μm.

Figure 2:
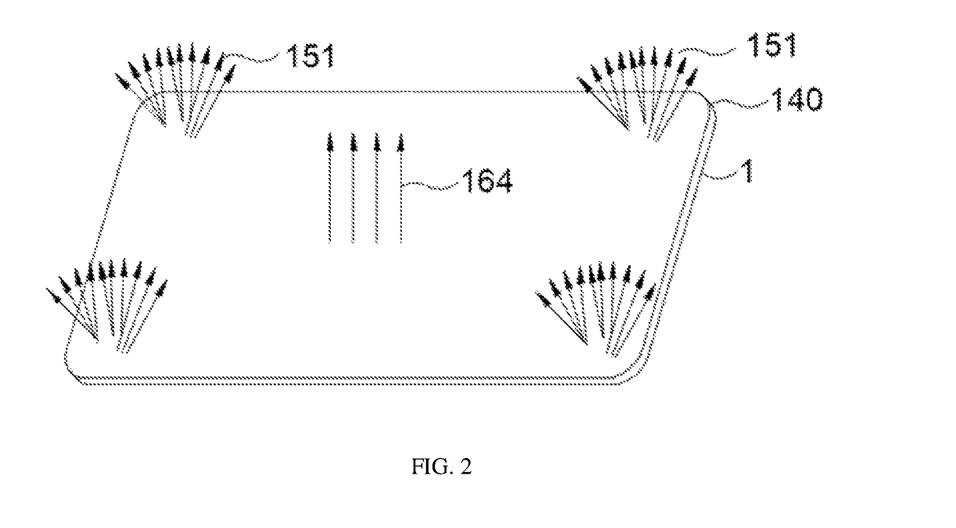
FIG. 2 is a schematic diagram of light emission of a backlight comprising the light guide plate provided by the embodiments of the present disclosure.
Figure 3:
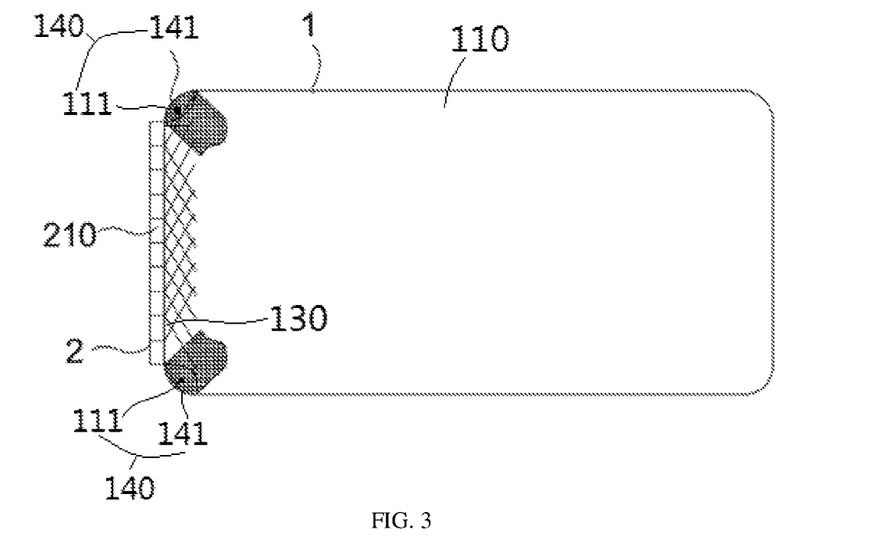
FIG. 3 is a schematic diagram of a curved structure of the light guide plate and an incident light provided by the embodiments of the present disclosure.

As shown in FIG. 2 and FIG. 3, each corner of the light guide plate body 100 according to the embodiments of the present disclosure has the curved structure 140. The curved structure 140 for example includes a rounded corner structure or other curved structure (e.g., an edge structure on both sides of a curved screen).

Because the light bar comprising LEDs cannot be arranged at the curved structure 140, only a region other than the curved structure 140 of the light incident surface 130 can receive the incident light from the light bar. Therefore, in order to introduce the incident light emitted by the light bar into the curved structure of the light guide plate body 100, in addition to arranging the first dot structures 150 at the curved structure (i.e., the first region 121) of the light guide plate bottom surface 140, it is also necessary to further provide the first dot structures 150 to a region outside the curved structure, that is, the first dot structures 150 are further provide in the transition region 1221 of the second region 122 and the transition region 1221 is adjacent to the edge of the first region 121. An area and a shape of the transition region 1221 need to be adjusted according to a target display brightness of the first region.

For example, the second dot structures 160 according to the embodiments of the present disclosure are dot structures adopted by the light guide plate of the ultra-high-brightness inverted-prism backlight; and the second dot structures 160 are used to totally reflect a remaining portion of the incident light (which refers to the portion of the incident light other than the portion diffusely reflected to the curved structure 140) to a region of the light emission surface 110 corresponding to the second region 122, so that the remaining portion of the incident light emits at a certain angle from the light emission surface 110, to finally form emergent light 164 under an action of the inverted-prism and be emitted out.

The first region 121 and the transition region 1221 of the light guide plate bottom surface 120 are both arranged with the first dot structures 150 having the surface roughness greater than the threshold; the surface roughness may be set according to the target display brightness of the first region; and other region of the light guide plate bottom surface 120 than the first region 121 and the transition region 1221 is arranged with the second dot structures 160 that implement total reflection. Thus, a portion of the incident light is diffusely reflected to the third region 111 of the light emission surface 110 corresponding to the first region 121 and then is emitted out, so that the light guide plate body 100 has diffusely reflected emergent light 151 emergent at respective angles in the third region 111 of the light emission surface 110, thereby solving the dark corner problem of the backlight. Meanwhile, due to a diffusing and fogging effect of the first dot structure 150 itself, the first dot structure 150 is invisible when the backlight is in a lighting state, so gradual transition arrangement is not needed for the purpose of preventing the dot structure from being visible. The first dot structures 150 are only arranged at the curved structure and the transition region, which do not affect the brightness of the backlight, thereby solving the dark corner problem at the curved structure while ensuring ultra-high brightness of the backlight.

In addition, by testing the brightness of the backlight, it is found that: in the conventional light guide plate, the brightness at the curved structure is about 40% of the brightness of the normal display region; however, in the embodiments of the present disclosure, the brightness at the curved structure is improved to about 85% to 90% of the brightness of the normal display region. The brightness at the curved structure of the light guide plate is greatly improved according to the embodiments of the disclosure, and therefore, the ultra-high-brightness inverted-prism backlight can be applied to the heteromorphic backlight such as the backlight of the mobile phone.

In the light guide plate provided by the embodiments of the present disclosure, the rough first dot structures 150 are added at the curved structure of the light guide plate bottom surface; as diffusely reflected by the rough first dot structures 150, a portion of the incident light corresponding to the non-curved structure is transmitted to the curved structure, while the remaining portion of the incident light is emergent in a normal direction as totally reflected by the second dot structures 160 of the light guide plate bottom surface. The arrangement of the first and second dot structures as described above can improve brightness at the curved structure without affecting the brightness of other regions of the backlight, thereby solving the problem of the dark corner defect of the ultra-high-brightness inverted-prism backlight.

Based on the above-described technical solutions, in order that the first dot structures 150 diffusely reflect the light, the embodiments of the present disclosure provide a possible implementation mode for the first dot structures 150 as follows.

Figure 6:
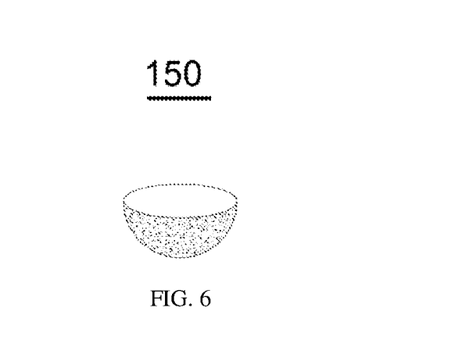
FIG. 6 is a structural schematic diagram of a first dot structure of the light guide plate provided by the embodiments of the present disclosure.

For example, as shown in FIG. 6, the first dot structure 150 is a three-dimensional curved structure protruding from the light guide plate bottom surface 120 along a direction away from the light emission surface; and the surface roughness Ra of the outer surface of the three-dimensional curved structure is 0.01 μm (micrometers) to 0.05 μm. Optionally, the surface roughness Ra is 0.03 μm.

The first dot structures 150 are protrusion structures on the light guide plate bottom surface 120, and the protrusion structures are arranged according an arrangement rule, so as to establish the diffuse reflection light path that allows a portion of the incident light to be transmitted to the curved structure. The arrangement rule may be designed according to the target display brightness, so as to meet different display requirements.

In order to achieve the diffuse reflection effect, the outer surface of the first dot structure 150 has the surface roughness greater than the threshold, and the surface roughness may be set and modified according to the diffuse reflection effect. For example, in order to satisfy the ultra-high-brightness display effect, the surface roughness Ra of the three-dimensional curved structure is set to 0.01 μm to 0.05 μm to ensure display brightness at the curved structure.

For example, as shown in FIG. 6, the three-dimensional curved structure according to the embodiments of the present disclosure is a hemispherical structure with the surface roughness; and the surface of the hemispherical structure has the surface roughness greater than the threshold.

Inventors of the present disclosure consider that, because the first dot structures 150 only need to satisfy the diffuse reflection light path, a specific structure thereof can be modified accordingly. Therefore, the embodiments of the present disclosure further provide another possible implementation mode for the first dot structure 150 as follows.

Figure 7:
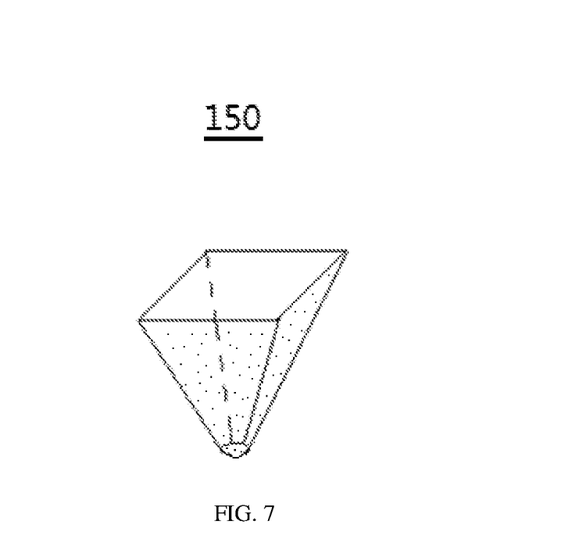
FIG. 7 is another structural schematic diagram of the first dot structure of the light guide plate provided by the embodiments of the present disclosure.

For example, as shown in FIG. 7, the first dot structure 150 is a pyramidal frustum structure protruding from the light guide plate bottom surface along the direction away from the light emission surface, and the surface roughness Ra of the outer surface of the pyramidal frustum structure is greater than the threshold, for example, the surface roughness Ra is 0.01 μm to 0.05 μm. Optionally, the surface roughness Ra is 0.03 μm.

For example, the first dot structures 150 are pyramidal frustum structures on the light guide plate bottom surface 120, and the pyramidal frustum structures are arranged according to an arrangement rule, so as to establish the diffuse reflection light path that allows a portion of the incident light to be transmitted to the curved structure. The arrangement rule may be designed according to the target display brightness, so as to meet different display requirements.

In order to achieve the diffuse reflection effect, the outer surface of the first dot structure 150 has the surface roughness greater than the threshold, and the surface roughness may be set and modified according to the diffuse reflection effect. For example, in order to satisfy the ultra-high-brightness display effect, the surface roughness Ra of the pyramidal frustum structure is set to 0.01 μm to 0.05 μm to ensure display brightness at the curved structure.

In the light guide plate provided by the embodiments of the present disclosure, the first dot structures 150 of different structures are provided, and diffuse reflection light paths corresponding to the first dot structures 150 of different structures are different, so different brightness display requirements can be met.

Based on the above-described technical solutions, the inventors of the present disclosure consider that: the light guide plate having the first dot structures 150 is fabricated by using an injection molding process with a mold core for forming dot structures of the light guide plate; in order to facilitate fabrication of the mold core for forming dot structures of the light guide plate, the pyramidal frustum structure for example is designed as follows: the pyramidal frustum structure has a first end surface located in the light guide plate bottom surface 120 and a second end surface away from the light guide plate bottom surface 120, and an area of the first end surface is larger than an area of an orthographic projection of the second end surface on the light guide plate bottom surface 120.

For example, the second end surface of the pyramidal frustum structure is an arc surface.

For example, the pyramidal frustum structure has two end surfaces, namely, the first end surface and the second end surface, the first end surface is located in the light guide plate bottom surface 120 and coincides with the light guide plate bottom surface 120; and the second end surface is away from the light guide plate bottom surface 120. Seen from the side surface of the light guide plate body, the first dot structure 150 has an overall structure with "a big upper portion and a small lower portion" on the light guide plate bottom surface 120, and such structure facilitates the fabrication of the corresponding mold core, and allows the mold core for forming dot structures of the light guide plate to be easily separated from the light guide plate after the injection molding process is completed.

In addition, the second end surface of the pyramidal frustum structure is set as the arc surface, which has more reflection angles than a flat surface, thereby having a better diffuse reflection effect.

Optionally, as shown in FIG. 7, the pyramidal frustum structure according to the embodiments of the present disclosure is a quadrangular pyramidal frustum structure with the surface roughness greater than the threshold, and the surface roughness of the quadrangular pyramidal frustum structure is set to meet the requirements of the diffuse reflection light path.

Based on the above-described technical solutions, in the embodiments of the present disclosure, each first dot structure 150 is the three-dimensional curved structure protruding from the bottom surface along the direction away from the light emission surface; or, each first dot structure 150 is the pyramidal frustum structure protruding from the bottom surface along the direction away from the light emission surface; or, among the plurality of first dot structures 150, at least one first dot structure is the three-dimensional curved structure protruding from the bottom surface along the direction away from the light emission surface and at least one first dot structure is the pyramidal frustum structure protruding from the bottom surface along the direction away from the light emission surface.

Based on the above-described technical solutions, in the embodiments of the present disclosure, in order that the entire backlight satisfies the target display brightness, a maximum length of an orthographic projection of each first dot structure on the bottom surface is smaller than a maximum length of an orthographic projection of each second dot structure on the bottom surface.

Based on the above-described technical solutions, in the embodiments of the present disclosure, in order that the entire backlight satisfies the target display brightness, an arrangement density of the plurality of first dot structures is smaller than an arrangement density of the plurality of second dot structures.

Based on the above-described technical solutions, the inventors of the present disclosure consider that, if a size of the rough first dot structure 150 that meets the requirements of the diffuse reflection light path is too large, a visible bright spot may be generated during the backlight is in the lighting state. Therefore, in order to prevent the first dot structure 150 from being visible in the lighting state of the backlight, the embodiments of the present disclosure provide a possible implementation mode as follows.

Optionally, with further reference to FIG. 6 and FIG. 7, the maximum length of the orthographic projection of the three-dimensional curved structure or the pyramidal frustum structure on the light guide plate bottom surface 120 is 10 µm to 30 µm. That is, the maximum length of the orthographic projection of the first dot structure 150 on the light guide plate bottom surface 120 is 10 µm to 30 µm The area of the orthographic projection of the first dot structure 150 on the light guide plate bottom surface 120 directly determines a size of a bright spot thereof on the backlight; if the bright spot is too large, the spot with brightness higher than that in a peripheral region of the spot will appear on the backlight, which may cause uneven brightness, thereby affecting the brightness effect of the entire backlight.

It should be noted that, the orthographic projection of the three-dimensional curved structure or the pyramidal frustum structure on the light guide plate bottom surface 120 refers to a projection of the three-dimensional curved structure or the pyramidal frustum structure on the light guide plate bottom surface 120 along a direction perpendicular to the light guide plate bottom surface 120.

It should be noted that, the maximum length refers to a length of a largest span of the orthographic projection. For example: in the case that the first dot structure 150 is the three-dimensional curved structure and is specifically the hemispherical structure, the maximum length is a diameter of the bottom surface of the hemispherical structure; in the case that the first dot structure 150 is the pyramidal frustum structure and is specifically the quadrangular pyramidal frustum structure, the maximum length is a largest diagonal length of the quadrangular bottom surface of the quadrangular pyramidal frustum structure; and if the quadrangular bottom surface of the quadrangular pyramidal frustum structure is a rectangle or a square, a length of any diagonal line is the maximum length of the corresponding orthographic projection.

Optionally, based on the above-described technical solutions, with further reference to FIG. 1, in the embodiments of the present disclosure, the area of the transition region 1221 of the second region 122 is in direct proportion to the target display brightness of the first region 121 adjacent to the transition region 1221.

Because the first dot structures 150 are also arranged in the transition region 1221, the larger the area of the transition region 1221 is, the larger the total number of the first dot structures 150 arranged in the second region 122 is, and the wider the range for arranging the first dot structures in the second region 122 is, so that more incident light is diffusely reflected to the region of the curved structure 140, thereby further improving the brightness of the region of the curved structure 140.

In the embodiments of the present disclosure, those skilled in the art may appropriately increase the area of the transition region 1221 of the second region 122 in order to enhance the display brightness at the curved structure 140; however, the increasing of the area of the transition region 1221 may affect the brightness corresponding to other region of the second region 122. Therefore, it is necessary to appropriately set the area of the transition region 1221 of the second region 122 in consideration of the target display brightness of the entire backlight, and thus the area of the transition region 1221 of the second region 122 is increased as much as possible without affecting the brightness of the entire backlight.

The inventors of the present disclosure consider that, the first dot structures 150 arranged in the transition region 1221 of the second region 122 only diffusely reflect a portion, entering from edge regions at both ends of the incident surface, of the incident light, and the amount of such portion of the incident light is limited, which may render insufficient brightness at the curved structure 140. Therefore, the embodiments of the present disclosure provide a possible implementation mode for the second region 122 as follows.

Figure 4:
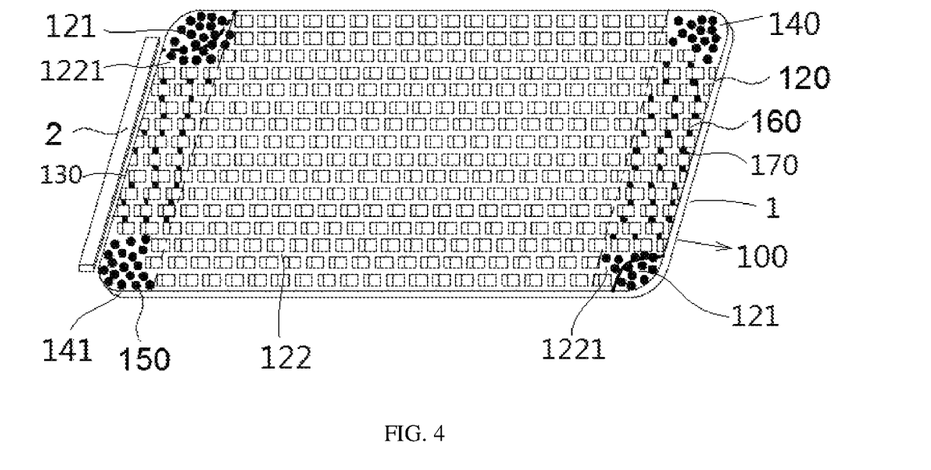
FIG. 4 is another structural schematic diagram of the bottom surface of the light guide plate provided by the embodiments of the present disclosure.

Optionally, as shown in FIG. 4, in the light guide plate bottom surface 120, a plurality of third dot structures 170 are arranged in a portion of the second region 122 between two first regions 121 at one end, close to the light incident surface 130, of the light guide plate body, and are arranged in a portion of the second region 122 between two first regions 121 at one end, away from the light incident surface 130, of the light guide plate body; and the third dot structures 170 are arranged at spaces between the plurality of second dot structures.

For example, an arrangement density of the third dot structures 170 in the second region 122 is smaller than an arrangement density of the first dot structures 150 in the first region 121 and the transition region 1221.

For example, an outer surface of the third dot structure 170 has a same surface roughness as the outer surface of the first dot structure 150.

In the embodiments of the present disclosure, in addition to arranging the first dot structures 150 in the first region 121 and the transition region 1221 of the second region 122 of the light guide plate bottom surface 120, the third dot structures 170 are arranged in some regions other than the transition region 1221 of the second region 122; and the third dot structures 170 are distributed between two first regions 121 at one end of the light guide plate body close to the light incident surface 130 and are distributed between two first regions 121 at one end of the light guide plate body away from the light incident surface 130, such that the incident light in the normal display region can be partially reflected to the corresponding curved structure 140.

The outer surface of the third dot structure 170 also has the surface roughness that implements the diffuse reflection light path; and the third dot structure 170 is arranged between adjacent second dot structures 160. For example, the third dot structure 170 is selectively arranged between adjacent ones of some second dot structures 160; and the total number of the second dot structures 160 may be set according to the target display brightness. The third dot structures 170 and the first dot structures 150 as described above are combined to form the diffuse reflection light paths, which can diffusely reflect more incident light to the corresponding curved structure 140, thereby improving the brightness at the curved structure 140.

Meanwhile, in order to control influence of the addition of the third dot structures 170 on the brightness of other regions of the second region 122, in the embodiments of the present disclosure, the arrangement density of the third dot structures 170 in the second region 122 is set to be smaller than the arrangement density of the first dot structures 150 in the first region 121 and the transition region 1221, so as to ensure the equalization of the overall brightness.

For example, the third dot structure 170 and the first dot structure 150 adopt a same structural form. In this way, as described below, the first dot structure 150 and the third dot structure 170 are fabricated with a same striker, so as to simplify the fabrication process.

It should be noted that, the third dot structure 170 and the first dot structure 150 may adopt different structural forms. For example, the first dot structure 150 is the three-dimensional curved structure, and the third dot structure 170 is the pyramidal frustum structure.

In the light guide plate provided by the embodiments of the present disclosure, by arranging the third dot structures 170 with the surface roughness greater than the threshold between adjacent second dot structures 160 at one end of the light guide plate bottom surface 120 that is close to the light incident surface 130 and at one end of the light guide plate bottom surface 120 that is away from the light incident surface 130, the third dot structures 170 scatter a portion of the incident light that cannot be diffusely reflected by the first dot structures 150 to the region of the corresponding curved structure 140, so as to improve the brightness at the curved structure 140 such as the rounded corner region; in addition, the arrangement density of the third dot structures 170 is relatively small, which will not affect the overall brightness of the backlight, so that the entire backlight can meet the target display brightness required by display.

Based on the above-described technical solutions, the embodiments of the present disclosure provide a possible implementation mode for the second dot structures 160, as described below.

Each second dot structure 160 is a three-dimensional structure protruding from the bottom surface 120 along the direction away from the light emission surface and includes a first inclined surface having an angle with respect to the bottom surface 120; and the first inclined surface totally reflects the light incident thereon into the light guide plate body.

Figure 5:
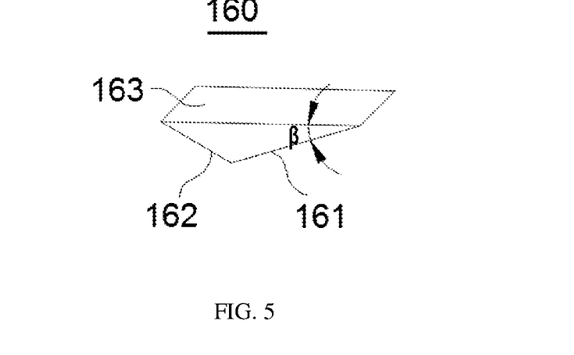
FIG. 5 is a structural schematic diagram of a second dot structure of the light guide plate provided by the embodiments of the present disclosure.

Optionally, as shown in FIG. 5, the second dot structure 160 includes the first inclined surface 161, a second inclined surface 162, and a bottom surface 163 that coincides with the light guide plate bottom surface 120; and the first inclined surface 161 is at an angle with respect to the bottom surface 163 so as to implement the total reflection of the incident light.

The second dot structure 160 is a protruding block with a triangular side surface, and comprises the first inclined surface 161, the second inclined surface 162 and the bottom surface 163; the bottom surface 163 coincides with the light guide plate bottom surface 120; the first inclined surface 161 is at the angle $\beta$ ($\beta$ for example is set between 0 degrees and 5 degrees) with respect to the light guide plate bottom surface 120; and the second inclined surface 162 is closer to the light incident surface 130 than the first inclined surface 161, and the first inclined surface 161 totally reflects the light incident thereon into the light guide plate body 100.

For example, the first inclined surface 161 and the light guide plate bottom surface 120 form the angle $\beta$ (e.g., $\beta=2$ degrees), a prism angle of the prism of the inverted-prism 4 is a set angle (e.g., 68 degrees); and an optical simulation demonstrates that, all light emitted by the light bar 2 in a direction perpendicular to an extension direction of the inverted-prism 4 is emergent in the normal direction of the backlight and forms totally reflected emergent light 164, thereby improving the display brightness of the backlight. The prism angle as described above is an angle included between the first inclined surface 161 and the second inclined surface 162.

Because the second dot structure 160 needs to implement total reflection of the light incident thereon, an outer surface of each second dot structure is smooth.

Figure 9:
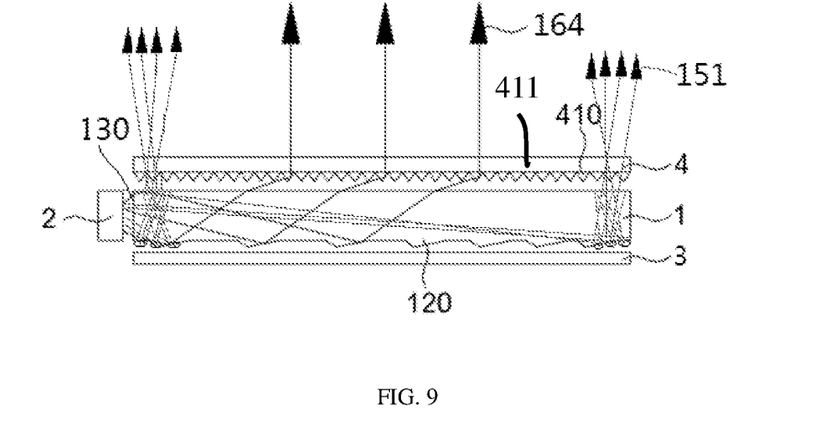
FIG. 9 is a structural schematic diagram of the backlight provided by the embodiments of the present disclosure.
Figure 10:
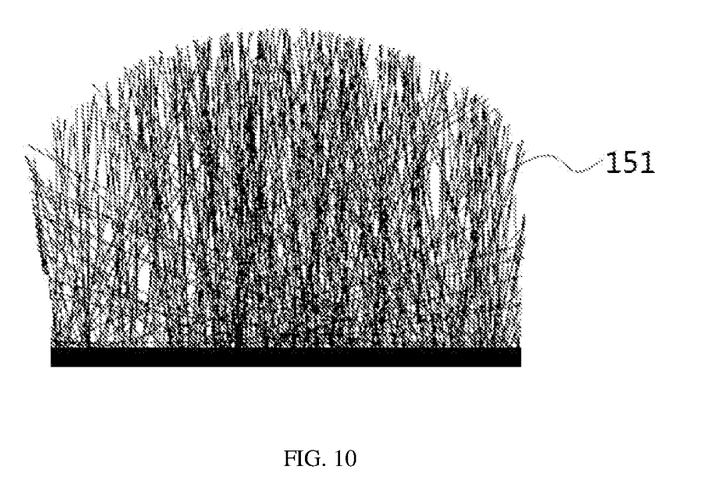
FIG. 10 is a structural schematic diagram of emergent light of the backlight provided by the embodiments of the present disclosure.

Based on a same inventive concept, as shown in FIG. 9 and FIG. 10, the embodiments of the present disclosure further provide the backlight, comprising: the light source 2, a reflective plate 3, the inverted-prism 4, and the light guide plate 1 according to any one of the above-described embodiments of the disclosure. The light source 2 is arranged corresponding to the region outside the curved structure 140 of the light incident surface 130; the reflective plate is provided opposite to the light guide plate bottom surface 120; the inverted-prism 4 includes a substrate 411 and a prism 410 arranged on the substrate 411; and a side of the inverted-prism 4 on which the prism 410 is arranged is provided opposite to the light emission surface 110.

The backlight provided by the embodiments of the present disclosure is the ultra-high-brightness inverted-prism backlight, and comprises the light source 2, the reflective sheet 3, the light guide plate 1 and the inverted-prism 4; the first dot structures 150 are arranged in the region of the curved structure 140 and the transition region 1221 in the light guide plate bottom surface 120, the first dot structures 150 are rough scattering dot structures for implementing diffuse reflection of incident light; the second dot structures 160 are arranged in other region of the light guide plate bottom surface 120, and the second dot structures 160 are heteromorphic dot structures for implementing total reflection of the incident light.

During an operation process of the backlight, light emitted by the light source 2 enters the light guide plate 1, the incident light reaches the second dot structures 160 on the light guide plate bottom surface 120 and is emergent from the light emission surface 110 of the light guide plate at a certain angle as being totally reflected by the second dot structures 160, and the light emergent from the light emission surface 110 of the light guide plate 1 undergoes refraction and total reflection of the prism 410 at a specific angle and is emergent in a normal direction of the backlight, so that all the light entering the prism from the inclined surface of the prism is collected as light emergent approximately in the normal direction, so as to enhance brightness of the backlight in the normal direction. Meanwhile, the light source 2 provides incident light and comprises a plurality LEDs 210; because the LEDs 210 cannot be arranged at the curved structure 140 of the light guide plate 1, it is necessary to arrange the first dot structures 150 having the surface roughness greater than the threshold at the curved structure 140 and the transition region 1221 of the light guide plate 1, so as to diffusely reflect a portion of the incident light to the corresponding curved structure 140 and form diffusely reflected light 151, thereby solving the problem of the dark corner defect in the region of the curved structure 140 such as rounded corners.

The backlight provided by the embodiments of the present disclosure adopts the light guide plate according to the embodiments of the present disclosure; the rough first dot structures 150 are arranged at the curved structure on the light guide plate bottom surface 120; as diffusely reflected by the rough first dot structures 150, a portion of incident light corresponding to the non-curved structure is transmitted to the curved structure, while other light is emergent in the normal direction as being totally reflected by the second dot structures 160 on the light guide plate bottom surface 120. The arrangement of the first and second dot structures can improve brightness at the curved structure 140 without affecting brightness of the backlight, thereby solving the dark corner problem of the ultra-high-brightness backlight.

Based on a same inventive concept, the embodiments of the present disclosure further provide a display device, comprising the backlight as described above.

Figure 11:
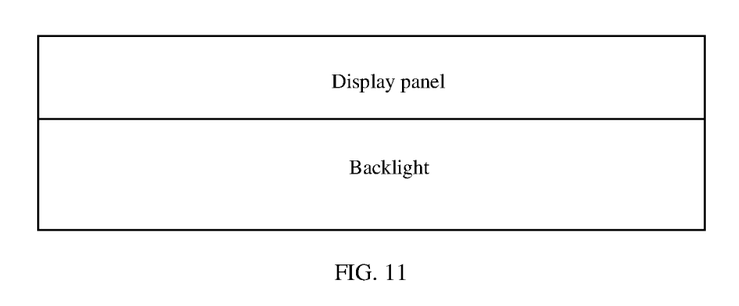
FIG. 11 is a structural schematic diagram of a display device provided by the embodiments of the present disclosure.

Referring to FIG. 11, the display device according to the embodiments of the present disclosure comprises a display panel and the backlight; the display panel is stacked on the backlight; and the light emitted from the backlight enters the display panel.

The display device provided by the embodiments of the present disclosure adopts the backlight according to the embodiments of the present disclosure, and thus can improve the brightness at the curved structure 140 without affecting the brightness of other region of the backlight, thereby solving the dark corner problem of the ultra-high-brightness backlight.

Based on a same inventive concept, the embodiments of the present disclosure further provide a dot striking apparatus for fabricating the light guide plate as described above, and the dot striking apparatus at least comprises a first striker and a second striker.

Figure 8:
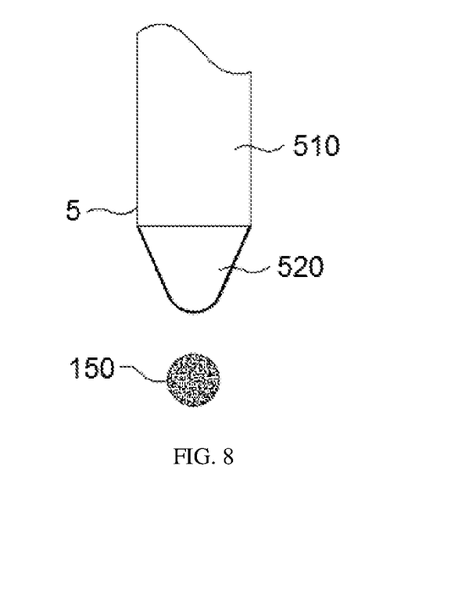
FIG. 8 is a structural schematic diagram of a striker of a dot striking apparatus provided by the embodiments of the present disclosure.

The first striker includes a first tool holder and a first tool head located at an end of the first tool holder, and the second striker includes a second tool holder and a second tool head located at an end of the second tool holder;

The first tool head is used for striking a mold core for forming dot structures of the light guide plate, so as to form first dot molds corresponding to the first dot structures 150 in the mold core for forming dot structures of the light guide plate; the second tool head is used for striking the mold core for forming dot structures of the light guide plate, so as to form second dot molds corresponding to the second dot structures 160 in the mold core for forming dot structures of the light guide plate.

A conventional processing method cannot meet requirements on size and scattering effect of the first dot structures 150 provided on the light guide plate bottom surface 120. Thus, according to the embodiments of the disclosure, the corresponding dot molds are fabricated in the mold core for forming dot structures of the light guide plate by using the dot striking apparatus having the first striker and the second striker, so that the light guide plate that meets the requirements can be finally fabrication.

Because the first dot structure 150 and the second dot structure 160 are different from each other in structure and size, the dot striking apparatus needs at least two strikers (i.e., the first striker and the second striker) to respectively form the first dot structure 150 and the second dot structure 160.

As shown in FIG. 8, each of the first striker and the second striker has a structure of the striker 5 shown in the drawing, and includes the corresponding tool holder 510 and tool head 520; and the tool head 520 for example is made of a hard metal (e.g., chromium) or a diamond material, so as to fabricate a corresponding dot mold in the mold core for forming dot structures of the light guide plate by striking. The striker is detachably connected with a striker mounting portion of the dot striking apparatus through the tool holder, which facilitates the replacement of the striker. The first dot mold corresponding to the first dot structure 150 is fabricated in the mold core for forming dot structures of the light guide plate by using the first tool head which has an end having the surface roughness greater than the threshold; and the second dot mold corresponding to the second dot structure 160 is fabricated in the mold core for forming dot structures of the light guide plate by using the second tool head. Optionally, the tool head 520 is a diamond tool head.

It should be noted that, in the embodiments of the present disclosure, other striker besides the first striker and the second striker may be added according to shape and scattering requirements of dot structures so as to meet fabrication requirements, which is not limited to the first striker and the second striker according to the embodiments of the present disclosure; moreover, through detachable connection of the striker with the dot striking apparatus, it is convenient to replace different strikers.

Optionally, in order to fabricate the dot mold corresponding to the first dot structure 150 in the mold core for forming dot structures of the light guide plate, a surface of the end of the first tool head has the same surface roughness as the outer surface of the first dot structure. In addition, in order to fabricate the three-dimensional curved structure or the pyramidal frustum structure corresponding to the first dot structure 150, the end of the first tool head is also fabricated into the corresponding three-dimensional curved structure or pyramidal frustum structure.

The dot striking apparatus provided by the embodiments of the present disclosure for example adjusts the shape and the roughness of the tool head according to the desired shape and scattering requirements of the dot structure, so as to fabricate the dot mold corresponding to the dot structure in the mold core for forming dot structures of the light guide plate, thereby facilitating subsequent process to obtain the light guide plate that meets the requirements and solving the dark corner problem of the ultra-high-brightness backlight.

Further, the outer surface of the third dot structure 170 has the same surface roughness as the outer surface of the first dot structure 150. In the case that the third dot structure 170 has the same shape and structure as the first dot structure 150, both of the third dot structure 170 and the first dot structure 150 are formed by using the first striker.

It should be noted that, some dot structures in the plurality of first dot structures 150 may have slight differences in size or shape; in the embodiments of the present disclosure, other striker may be designed by modifying the first striker; and a specific structure of each striker and the total number of the strikers for replacement may be correspondingly determined according to actual requirements of dot structures, which are not limited here.

For example, in the case that the first dot structure 150 is the three-dimensional curved structure or the pyramidal frustum structure, the end of the tool head of the first striker also adopts the same structure, so that the first dot structure 150 of the three-dimensional curved structure or the pyramidal frustum structure is fabricated by using the corresponding mold core, to facilitate subsequent fabrication of rough scattering dot structures having different diffuse reflection effects.

Based on a same inventive concept, the embodiments of the present disclosure further provide a method for fabricating the light guide plate as described above by using the dot striking apparatus according to the above-described embodiments of the disclosure. For example, the method comprises:

striking the mold core for forming dot structures of the light guide plate by using the second striker of the dot striking apparatus according a second arrangement rule, to form the second dot molds corresponding to the second dot structures 160 in the mold core for forming dot structures of the light guide plate;

striking the mold core for forming dot structures of the light guide plate by using the first striker of the dot striking apparatus according a first arrangement rule, to form the first dot molds corresponding to the first dot structures 150 in the mold core for forming dot structures of the light guide plate; and performing an injection molding process by using the mold core for forming dot structures of the light guide plate which includes the first dot molds and the second dot molds to obtain the light guide plate.

Dot structure coordinates respectively corresponding to the first arrangement rule and the second arrangement rule are pre-generated by simulation according to the target display brightness.

Because the second dot structure 160 and the first dot structure 150 are different from each other in structure, the dot mold corresponding to the second dot structure 160 and the dot mold corresponding to the first dot structure 150 need to be formed separately. In the embodiments of the present disclosure, the second dot structure 160 is the dot structure of the ultra-high-brightness backlight; the plurality of second dot molds are formed at corresponding positions in the mold core for forming dot structures of the light guide plate by striking with the second striker of the dot striking apparatus; and the second dot molds have the same position, shape and size as the second dot structures 160 to be fabricated. The second dot molds are distributed in the mold core for forming dot structures of the light guide plate according to the second arrangement rule.

Then, the second striker of the dot striking apparatus is replaced with the first striker; the plurality of first dot molds are formed at corresponding positions in the mold core for forming dot structures of the light guide plate, in which the second dot molds have been already fabricated, by striking with the first striker of the dot striking apparatus; and the first dot molds have the same position, shape and size as the first dot structures 150 to be fabricated. The first dot molds are distributed in the mold core for forming dot structures of the light guide plate according to the first arrangement rule.

Then, the light guide plate according to the embodiments of the present disclosure is obtained by using the injection molding process with the mold core for forming dot structures of the light guide plate in which the second dot molds and the first dot molds have already been fabricated.

It should be noted that, the dot structure coordinates respectively corresponding to the second arrangement rule and the first arrangement rule are generated by simulation according to the target display brightness. During the fabrication of the second dot molds and the first dot molds with the dot striking apparatus, the corresponding dot structure coordinates are input into the dot striking apparatus, so as to accurately fabricate the second dot molds and the first dot molds in the mold core for forming dot structures of the light guide plate. In addition, the order of forming the second dot molds and the first dot molds may be adjusted without affecting the quality of the light guide plate.

In the method for fabricating the light guide plate provided by the embodiments of the present disclosure, the dot molds corresponding to the dot structures are fabricated in the mold core for forming dot structures of the light guide plate by using the dot striking apparatus; the light guide plate having the first dot structures 150 and the second dot structures 160 is obtained by the injection molding process; the arrangement of the first dot structures 150 and the second dot structures 160 improves the brightness at the curved structure 140 without affecting the brightness of other region of the backlight, thereby solving the dark corner problem of the ultra-high-brightness backlight; and the fabricating method is simple and convenient for mass production without causing problems such as visible dot structures and brightness reduction.

Based on the above-described technical solution, in order to further improve the display brightness at the curved structure 140 of the light guide plate, before the injection molding process is performed by using the mold core for forming dot structures of the light guide plate, the method further comprises forming third dot molds corresponding to the third dot structures 170 in the mold core for forming dot structures of the light guide plate.

For example, the method comprise: striking the mold core for forming dot structures of the light guide plate, in which the second dot molds have already been formed, by using the first striker of the dot striking apparatus according a third arrangement rule, to form third dot molds corresponding to the third dot structures 170 in the mold core for forming dot structures of the light guide plate.

The third dot structure 170 has the same surface roughness as the first dot structure 150, so the third dot molds is fabricated in the mold core for forming dot structures of the light guide plate according to the third arrangement rule by using the first striker; the third dot molds are distributed between adjacent second dot molds; and specific distribution positions and the total number of the third dot molds are adjusted according to the target display brightness. Of course, the third dot structure 170 may have a structure different from that of the first dot structure 150, in this case, other striker (e.g., a third striker) besides the first striker and the second striker may be provided, so that the third dot mold corresponding to the third dot structure 170 is fabricated in the mold core for forming dot structures of the light guide plate.

It should be noted that, dot structure coordinates corresponding to the third arrangement rule are generated by simulation according to the target display brightness; and during the fabrication of the third dot molds with the dot striking apparatus, the corresponding dot structure coordinates of the third dot structures 170 are input into the dot striking apparatus, so as to accurately fabricate the third dot molds in the mold core for forming dot structures of the light guide plate.

Optionally, in the case that the third dot structure 170 has the same structure as the first dot structure 150, the first dot mold and the third dot mold are formed together in the mold core for forming dot structures of the light guide plate by using the first striker of the dot striking apparatus, so as to improve fabrication efficiency of the light guide plate.

In the method for fabricating the light guide plate provided by the embodiments of the present disclosure, the dot molds corresponding to the dot structures are fabricated in the mold core for forming dot structures of the light guide plate by using the dot striking apparatus; the light guide plate having the first dot structures 150, the second dot structures 160 and the third dot structures 170 is obtained by the injection molding process by using the mold core; and the arrangement of the first dot structures 150, the second dot structures 160 and the third dot structures 170 improves the brightness at the curved structure 140 without affecting the brightness of other region of the backlight.

The embodiments of the present disclosure achieve at least advantageous effects below:

1. The rough first dot structures are provided at the curved structure of the light guide plate bottom surface; as being diffusely reflected by the rough first dot structures, a portion of the incident light corresponding to a non-curved structure is transmitted to the curved structure while other portion of the incident light is emergent in a normal direction as being totally reflected by the second dot structures provided on the light guide plate bottom surface; and such dot structure arrangement can improve the brightness at the curved structure without affecting brightness of other region of the backlight, thereby solving the dark corner problem of the ultra-high-brightness backlight.

2. The first dot structures of different structures are provided, and diffuse reflection light paths corresponding to the first dot structures of different structures are different, so different requirements on the display brightness can be met.

3. By arranging the third dot structures with the surface roughness greater than the threshold between adjacent second dot structures at one end of the light guide plate bottom surface that is close to the light incident surface and at one end of the light guide plate bottom surface that is away from the light incident surface, the third dot structures scatter the portion of the incident light that cannot be diffusely reflected by the first dot structures to the corresponding region of the curved structure, so as to further improve the brightness at the curved structure such as the rounded corner region; in addition, the density of the third dot structures is relatively small, which will not affect the overall brightness of the backlight, so that the entire backlight can meet the requirements on the target display brightness.

4. The backlight adopting the light guide plate according to the embodiments of the present disclosure can improve the brightness at the curved structure without affecting the brightness of other region of the backlight, thereby solving the dark corner problem of the ultra-high-brightness backlight.

5. The display device adopting the backlight according to the embodiments of the present disclosure can improve the brightness at the curved structure without affecting the brightness of other region of the backlight, thereby solving the dark corner problem of the ultra-high-brightness backlight.

6. The shape and the roughness of the tool head of the striker are adjusted according to the desired shape and scattering requirements of the dot structure, to fabricate the dot mold corresponding to the dot structure in the mold core for forming dot structures of the light guide plate, so as to facilitate subsequent process to obtain the light guide plate that meets the requirements, thereby solving the dark corner problem of the ultra-high-brightness backlight.

7. The dot molds corresponding to the first dot structures and the dot molds corresponding to the second dot structures are fabricated in the mold core for forming dot structures of the light guide plate by using the dot striking apparatus; the light guide plate having the first dot structures and the second dot structures is obtained by the injection molding process; such dot structure arrangement can improve the brightness at the curved structure without affecting the brightness of other region of the backlight, thereby solving the dark corner problem of the ultra-high-brightness backlight; and the fabrication method is simple and convenient for mass production, without causing problems such as visible dot structures and brightness reduction.

Those skilled in the art may understand that, steps, measures, and solutions in the various operations, methods, and processes that have been discussed in the embodiments of the present disclosure may be alternated, modified, combined, or deleted.

In the description of the embodiments of the present disclosure, it should be understood that directional or positional relationships shown by terms such as "center", "upper", "lower", "front", "rear", "left", "right", "vertical", "horizontal", "top", "bottom", "inner" and "outer" are directional or positional relationships shown as in the drawings, which only means to facilitate description of the embodiments of the present disclosure and simplify the description, but do not indicate or imply that the devices or components must have specific directions, or be constructed or operated in the specific directions, and are not limitative of the embodiments of the present disclosure.

Terms like "first" and "second" are merely provided for the purpose of description other than indicating or implying their relative importance or implicitly denoting the number of technical features indicated thereby. Thus, features with "first" or "second" defined may include one or more of the features either explicitly or implicitly. In the description of the embodiments of the present disclosure, unless otherwise stated, the term "a plurality of" refers to two or more.

In the description of the embodiments of the present disclosure, it should be noted that, unless otherwise unambiguously specified and defined, terms like "mounting", "coupling" and "connection" should be construed in its broad sense, for example, it may be fixed connection, or detachable connection, or integral connection; it may also be direct connection, or may also be indirect connection through an intermediate medium. It will be understood by those ordinarily skilled in the art that the specific meanings of the above terms vary in different contexts.

Specific features, structures, or characteristics described herein may be combined in a suitable manner in any one or more embodiments or examples.

What have been described above are merely exemplary embodiments of the present disclosure, and are not intended to limit the protection scope of the present disclosure, which is determined by the appended claims.

The invention claimed is:

1. A light guide plate, comprising a light guide plate body, the light guide plate body including a light emission surface, a bottom surface opposite to the light emission surface, and a plurality of side surfaces connecting the light emission surface and the bottom surface, wherein
corners of the light guide plate body are curved structures, each of the curved structures includes a first region located in the bottom surface, a curved surface region located in the side surfaces, and a third region located in the light emission surface and opposite to the first region;
one side surface of the plurality of side surfaces is configured as a light incident surface of the light guide plate body, and a region other than the curved surface region of the light incident surface is configured for receiving incident light from a light source;
the light guide plate bottom surface further includes a second region other than the first region;
a plurality of first dot structures are arranged in the first region and a transition region of the second region that is adjacent to an edge of the first region; an outer surface of each of the first dot structures has a surface roughness greater than a threshold, so that a portion of the incident light is diffusely reflected to the third region by the first dot structures and emits; and
a plurality of second dot structures are arranged in a region other than the transition region of the second region.

2. The light guide plate according to claim 1, wherein
each of the first dot structures is a three-dimensional curved structure protruding from the bottom surface along a direction away from the light emission surface; or
each of the first dot structures is a pyramidal frustum structure protruding from the bottom surface along the direction away from the light emission surface; or
among the plurality of first dot structures, at least one first dot structure is the three-dimensional curved structure protruding from the bottom surface along the direction away from the light emission surface and at least one first dot structure is the pyramidal frustum structure protruding from the bottom surface along the direction away from the light emission surface.

3. The light guide plate according to claim 2, wherein the pyramidal frustum structure has a first end surface and a second end surface that are opposite to each other; the first end surface is located in the bottom surface; the second end surface is away from the bottom surface; and an area of the first end surface is larger than an area of an orthographic projection of the second end surface on the bottom surface.

4. The light guide plate according to claim 3, wherein the second end surface of the pyramidal frustum structure is an arc surface.

5. The light guide plate according to claim 2, wherein the three-dimensional curved structure is a hemispherical structure.

6. The light guide plate according to claim 1, wherein each of the second dot structures is a three-dimensional structure protruding from the bottom surface along a direction away from the light emission surface and includes a first inclined surface having an angle with respect to the bottom surface; and the first inclined surface totally reflects light incident thereon into the light guide plate body.

7. The light guide plate according to claim 1, wherein a maximum length of an orthographic projection of each of the first dot structures on the bottom surface is smaller than a maximum length of an orthographic projection of each of the second dot structures on the bottom surface.

8. The light guide plate according to claim 1, wherein an arrangement density of the plurality of first dot structures is smaller than an arrangement density of the plurality of second dot structures.

9. The light guide plate according to claim 1, wherein a maximum length of an orthographic projection of each of the first dot structures on the bottom surface is 10 μm to 30 μm.

10. The light guide plate according to claim 1, wherein the surface roughness of the outer surface of each of the first dot structures is represented by Ra, which is 0.01 μm to 0.05 μm.

11. The light guide plate according to claim 1, wherein an outer surface of each of the second dot structures is smooth.

12. The light guide plate according to claim 1, wherein an area of the transition region of the second region is in direct proportion to a target display brightness of the first region adjacent to the transition region.

13. The light guide plate according to claim 1, wherein
a plurality of third dot structures are arranged in a portion of the second region between two first regions at one end, close to the light incident surface, of the light guide plate body, and are arranged in a portion of the second region between two first regions at one end, away from the light incident surface, of the light guide plate body, and the third dot structures are arranged at spaces between the plurality of second dot structures;

an arrangement density of the third dot structures in the second region is smaller than an arrangement density of the first dot structures in the first region and the transition region; and an outer surface of each of the third dot structures has a same surface roughness as the outer surface of each of the first dot structures.

14. The light guide plate according to claim 13, wherein a structure of each of the third dot structures is the same as a structure of each of the first dot structures.

15. A backlight, comprising: a light source, a reflective plate, an inverted-prism, and the light guide plate according to claim 1, wherein
the light source is arranged opposite to the region other than the curved surface region of the light incident surface;
the reflective plate is provided on a side of the bottom surface that is away from the light emission surface;
the inverted-prism is provided on a side of the light emission surface that is away from the bottom surface; the inverted-prism includes a substrate and a prism arranged on the substrate; and the prism is located on a side of the substrate that is close to the light emission surface.

16. A display device, comprising: the backlight according to claim 15 and a display panel, wherein light emitted from the backlight enters the display panel.

17. A dot striking apparatus for fabricating the light guide plate according to claim 1, comprising: a first striker and a second striker, wherein
the first striker includes a first tool holder and a first tool head located at an end of the first tool holder, and the second striker includes a second tool holder and a second tool head located at an end of the second tool holder;
the first tool head is configured for striking a mold core for forming dot structures of the light guide plate, so as to form first dot molds corresponding to the first dot structures in the mold core for forming dot structures of the light guide plate; and
the second tool head is configured for striking the mold core for forming dot structures of the light guide plate, so as to form second dot molds corresponding to the second dot structures in the mold core for forming dot structures of the light guide plate.

18. The dot striking apparatus according to claim 17, wherein a top surface of the first tool head has a same surface roughness as the outer surface of each of the first dot structures.

19. A method for fabricating the light guide plate by using the dot striking apparatus according to claim 17, comprising:
striking the mold core for forming dot structures of the light guide plate by using the second striker of the dot striking apparatus according a second arrangement rule, to form the second dot molds corresponding to the second dot structures in the mold core for forming dot structures of the light guide plate;
striking the mold core for forming dot structures of the light guide plate by using the first striker of the dot striking apparatus according a first arrangement rule, to form the first dot molds corresponding to the first dot structures in the mold core for forming dot structures of the light guide plate; and
performing an injection molding process by using the mold core for forming dot structures of the light guide plate which includes the first dot molds and the second dot molds to obtain the light guide plate, wherein
dot structure coordinates corresponding to the second arrangement rule are pre-generated by simulation according to a target display brightness of the second region;
dot structure coordinates corresponding to the first arrangement rule are pre-generated by simulation according to a target display brightness of the first region;
before forming the second dot molds, the dot structure coordinates corresponding to the second arrangement rule are input into the dot striking apparatus; and
before forming the first dot molds, the dot structure coordinates corresponding to the first arrangement rule are input into the dot striking apparatus.

20. The method according to claim 19, wherein
a plurality of third dot structures are arranged in a portion of the second region between two first regions at one end, close to the light incident surface, of the light guide plate body, and are arranged in a portion of the second region between two first regions at one end, away from the light incident surface, of the light guide plate body, and the third dot structures are arranged at spaces between the plurality of second dot structures;
an arrangement density of the third dot structures in the second region is smaller than an arrangement density of the first dot structures in the first region and the transition region;
before performing the injection molding process, the method further comprises: striking the mold core for forming dot structures of the light guide plate by using the first striker of the dot striking apparatus according a third arrangement rule, to form third dot molds corresponding to the third dot structures in the mold core for forming dot structures of the light guide plate;
dot structure coordinates corresponding to the third arrangement rule are pre-generated by simulation according to the target display brightness of the first region; and
before forming the third dot molds, the dot structure coordinates corresponding to the third arrangement rule are input into the dot striking apparatus.

* * * * *